United States Patent

Neely

[15] 3,681,434

[45] Aug. 1, 1972

[54] BATCH DISTILLATION OF PHTHALATE ESTERS WITH RECYCLE AND SPRAYING

[72] Inventor: John Waller Neely, Stockton-on-Tees, England

[73] Assignee: Imperial Chemical Industries Limited, London, England

[22] Filed: April 17, 1970

[21] Appl. No.: 29,654

[30] Foreign Application Priority Data

April 30, 1969 Great Britain ............ 22,084/69

[52] U.S. Cl. ............ 260/475 B, 203/14, 203/90, 203/98, 203/DIG. 6, 203/DIG. 11
[51] Int. Cl. ............ B01d 3/00, C07c 69/76
[58] Field of Search ....... 203/98, 99, 90, 14, DIG. 11, 203/DIG. 6; 260/475 B; 202/153, 236

[56] References Cited

UNITED STATES PATENTS

| | | |
|---|---|---|
| 1,516,314 | 11/1924 | Sebald ................ 202/153 |
| 1,993,886 | 3/1935 | Jaeger et al. ............ 203/90 |
| 2,159,621 | 5/1939 | Van Dijck ............ 203/98 |
| 2,403,393 | 8/1946 | Atkins ................ 203/98 |
| 2,861,981 | 11/1958 | Frank et al. ............ 260/488 J |
| 3,341,429 | 9/1967 | Fondrk ................ 203/95 |
| 3,404,175 | 10/1968 | Mercier ................ 203/14 |

FOREIGN PATENTS OR APPLICATIONS

| | | |
|---|---|---|
| 185,795 | 9/1955 | Austria ................ 203/90 |
| 1,096,917 | 12/1967 | Great Britain ............ 260/475 B |

*Primary Examiner*—Wilbur L. Bascomb, Jr.
*Attorney*—Cushman, Darby & Cushman

[57] ABSTRACT

In a batch distillation process, particularly a batch esterification process in which water is continuously distilled off, the time required for removal of the volatile component is shortened by withdrawing a part of the liquid distilland and introducing it into the vapor space above the liquid as a spray of fine droplets.

2 Claims, 1 Drawing Figure

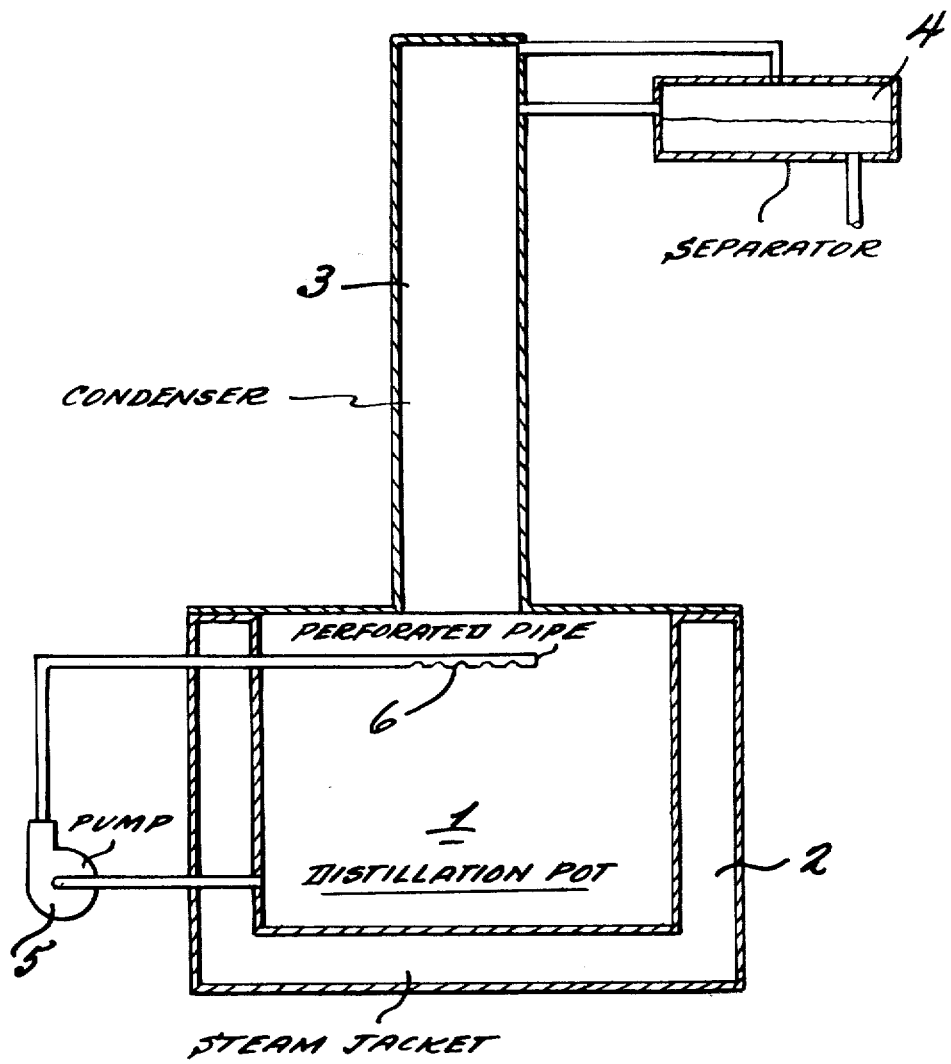

BATCH DISTILLATION OF PHTHALATE ESTERS WITH RECYCLE AND SPRAYING

The present invention relates to a distillation process.

In distillation processes it is often difficult to remove the last trace of a more volatile component from a liquid distilland even when the process is conducted under reduced pressure. We believe that one reason for this is the pressure exerted by the static head of liquid distilled and which hinders the escape of the more volatile component particularly when the concentration of the latter is low compared with that of the involatile component. This effect is aggravated in industrial as opposed to laboratory distillations because the static head of liquid is usually larger and the ratio of its surface area to volume less.

We have now devised an improved batch distillation process in which the adverse effect of the static head of liquid distilland is substantially reduced leading to a more effective separation of the distilland components.

Accordingly the invention comprises a batch distillation process in which part of the liquid distilland is withdrawn during the distillation and is introduced to the vapor space above said liquid in the form of a spray of small droplets.

The liquid may be withdrawn continuously during the distillation and may be continuously introduced to the vapor space. If desired, however, the invention may be used only at the latter states of a distillation when the concentration of the more volatile component becomes sufficiently small for its removal to be difficult by conventional distillation techniques.

The rate at which the liquid distilland is withdrawn and introduced to the vapor space depends on the ease with which the more volatile component is removed. Generally, however, the higher the rate at which the liquid distilland is circulated in this manner the better. For example, the hourly circulation rate may be 4 to 10 times the volume of the distilland, i.e. for a $5M^3$ volume of distilland the liquid may be withdrawn and circulated at a rate of 20 to 50 $M^3$/hour. If desired the liquid which is withdrawn may be heated before being introduced into the vapor space so as to facilitate the separation of the more volatile component. The liquid may be heated to maintain its temperature at that of the bulk liquid distilland or it may be heated to a higher temperature than that of the bulk liquid distilland. For example, the liquid which is withdrawn may be heated to a temperature up to 50° C higher than the temperature of the bulk of the liquid distilland.

The liquid distilland is preferably withdrawn from the distillation vessel by means of a pump which then delivers the liquid to the vapor space via a suitable distributor, e.g. a section of perforated pipe projecting into the vapor space. If desired a heater may be located after the pump so as to heat the liquid as described above.

The process of the invention is of particular use in removing small amounts of a relatively volatile substance from a large bulk of less volatile material. It is particularly useful in circumstances in which there is a constraint on the temperature to which the liquid distilland may be heated to drive off the last traces of the more volatile component. Such a constraint may be due to high temperature instability of the bulk of the distilland or to adverse effect of high temperature on one or more parts of the distillation equipment, e.g. a lining sensitive to high temperatures. In this latter instance, the use of a heater to heat the circulating liquid to a temperature above that of the bulk of the distilland may be advantageous.

The invention may be used in distillation processes operating over a wide range of temperatures and pressures, e.g. at temperatures in the range 50° to 300° C and pressures up to 1 atmosphere particularly up to 0.5 atmosphere.

We have found the process of the invention of particular use in esterification processes in which it is important to remove as much of the water formed as co-product as possible so as to drive the reaction to completion. In particular we have found that in the production of esters of orthophthalic acid with $c_4$ to $C_{14}$ alkanols, e.g. octanol, the last traces of water, e.g. concentrations of water of the order of 0.01 percent weight, are very difficult to remove by distillation. Although these di-esters are relatively involatile it is not possible to heat them to too high a temperature as unwanted color formulation tends to take place which detracts from their primary use as plasticizers for chlorinated organic polymers. By use of the process of the present invention color formation is minimized, the water concentration is further reduced and esterification made more complete.

The invention will now be further described with reference to the following Example and the accompanying schematic drawing.

EXAMPLE WITH DESCRIPTION OF THE DRAWING

A lead-lined distillation pot 1 of $8M^3$ capacity was charged with a 5 ton charge of phthalic anhydride, iso-octanol and a catalytic amount of sulphuric acid. The iso-octanol was in 5 percent excess over the stoichiometric amount required to produce the di-ester. The distillation pot was enclosed by a steam jacket 2 which was used to heat the contents of the pot to an initial temperature of 120° C, increasing during the esterification reaction to a final temperature of 145° C. The distillation pot was fitted with a condenser 3 and separator 4 in which the mixture of iso-octanol and water taken off overhead was condensed and separated, the iso-octanol being returned to the distillation and the water being put to drain. The esterification reaction took 5 hours and the pressure was maintained at 50 – 60 mm.

Towards the end of the esterification reaction liquid was withdrawn from the distilland in the pot and pumped by pump means 5 via a perforated pipe 6 into the vapor space above the liquid in the esterification pot. The pump delivered at a rate of 20 $M^3$/hour. By use of this technique the final traces of water in the distilland were removed more quickly than by the use of a conventional distillation method.

What is claimed is:

1. In a batch esterification process wherein phthalic acid or anhydride is reacted with a $C_4$ to $C_{14}$ alkanol to form the phthalate ester of said alkanol and water as a by-product and the liquid reaction mixture containing said ester and by-product water is distilled at a temperature of 50° C to 300° C and a pressure of up to 1 atmospheres to remove water from said ester, the improvement whereby the removal of traces of water is facilitated, said improvement comprising withdrawing a part of said liquid reaction mixture during said distillation, heating the withdrawn part to a temperature up to 50° C higher than the temperature of the rest of the reaction mixture undergoing distillation and introducing the thus heated part into the vapor space above said reaction mixture in the form of a spray of fine droplets at an hourly circulation rate of 4 to 10 times the volume of the reaction mixture undergoing distillation.

2. The process of claim 1 wherein the alkanol is iso-octanol and the ester product is di-iso-octyl phthalate.

* * * * *